United States Patent [19]

Recker

[11] 4,402,626
[45] * Sep. 6, 1983

[54] TORQUE TRANSMITTING COUPLING

[76] Inventor: Florian B. Recker, 802 First St., Dyersville, Iowa 52040

[*] Notice: The portion of the term of this patent subsequent to Sep. 15, 1998, has been disclaimed.

[21] Appl. No.: 233,003

[22] Filed: Feb. 9, 1981

[51] Int. Cl.³ .................... B25G 3/18; F16B 21/00; F16D 1/00

[52] U.S. Cl. ..................... 403/328; 403/11; 403/359; 403/317

[58] Field of Search ............. 403/328, 327, 325, 322, 403/320, 316, 317, 11, 359; 285/314, 315, 316, 317, 308, 85, 86; 64/6, 4, 32 P

[56] References Cited

U.S. PATENT DOCUMENTS

| | | | |
|---|---|---|---|
| 3,260,541 | 7/1966 | Sadler et al. | 403/325 |
| 3,480,310 | 11/1969 | McElwain | 285/314 X |
| 3,678,439 | 7/1972 | Vetter | 403/325 |
| 3,747,966 | 7/1973 | Wilkes et al. | 403/325 X |
| 3,796,502 | 3/1974 | Federspiel | 285/317 X |
| 4,198,080 | 4/1980 | Carpenter | 403/325 X |
| 4,289,414 | 9/1981 | Recker | 403/328 X |
| 4,318,630 | 3/1982 | Herchenbach | 403/322 |

Primary Examiner—Wayne L. Shedd
Attorney, Agent, or Firm—Henderson & Sturm

[57] ABSTRACT

A torque transmitting coupling including a housing, an internally splined opening in the housing being adapted to receive an externally splined shaft. Locking structure is provided for selectively locking the shaft into the opening in the housing, such locking structure being biased to a locked position and selectively movable to an unlocked position. The locking structure includes means for automatically locking the shaft into the housing upon insertion of the shaft into the housing and further includes a structure for allowing unlocking of the shaft from the housing. The locking structure includes a plurality of bores radially disposed in the housing, a locking element slideably disposed in each of the bores and being radially movable from an inner, locking position, wherein the elements are engageable within a recess of the shaft to prevent relative axial movement of the housing with respect to the shaft; and, an outer, unlocked position, whereby the elements permit relative axial movement of the housing and the shaft. A lock open mechanism is also provided to hold the locking elements in the unlocked position when the shaft is withdrawn.

16 Claims, 16 Drawing Figures

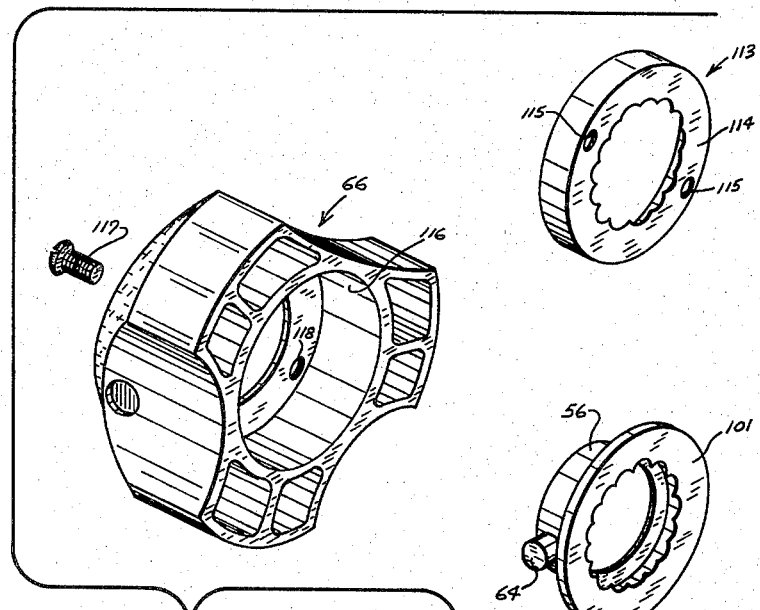
FIG. 7
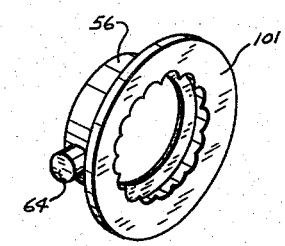
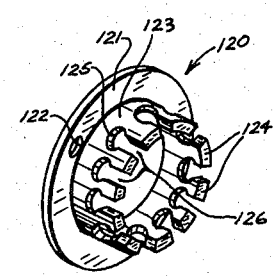
FIG. 9
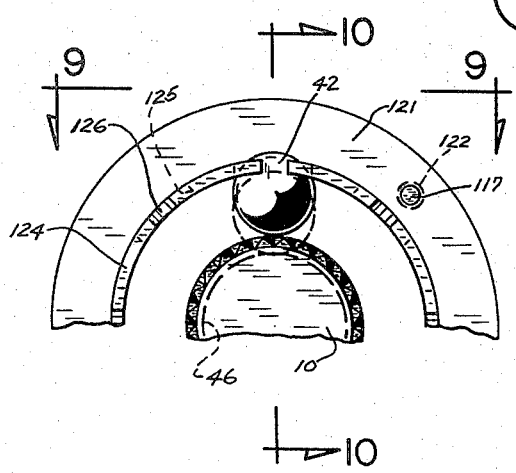
FIG. 8
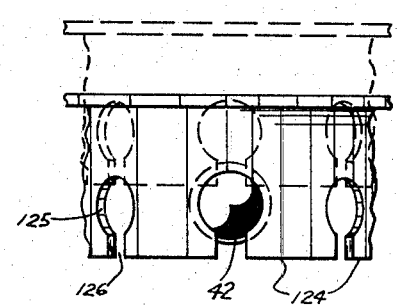

TORQUE TRANSMITTING COUPLING

A lock open mechanism is also provided to hold the locking elements in the unlocked position when the shaft is withdrawn.

BACKGROUND OF THE INVENTION

The present invention relates generally to shaft couplings and more particularly to a shaft coupling for transmitting a torque force from one shaft to another.

The problem of how to couple one shaft to another for transmitting a torque force is a long standing one. This has particularly been a problem in the farming community wherein the power take-off of an agricultural tractor frequently must be connected and disconnected to utilize one implement and then another. This problem has been solved in the past to one degree or another and one of the most commercially successful of these solutions is a connection of the type disclosed in U.S. Pat. No. 3,747,966 to Wilkes, et al, issued in 1973. The commercial success of the coupling of this Wilkes, et al, patent has been excellent, but even a quick view of the patent discloses many parts which must be made and a considerable number of grooves and holes, all of which lead to additional cost and, to some extent, a complicated operation for use.

To operate the coupler of the Wilkes, et al, patent referred to above, assuming that the drive train connected thereto is desired to be connected to the power take-off shaft of a tractor, the safety guard of the coupler must be pulled rearwardly to overcome the bias of a spring and free the coupling elements to permit the coupler to be placed over the power take-off shaft, and while this rearward pulling is accomplished, the operator must also forwardly pull a very heavy drive train having telescoping parts which also add to the drag which must be overcome; and, once the coupler is placed over the power take-off shaft, then the guard can be released so that the coupling elements engage and lock the coupler to the power take-off shaft of the tractor.

If it happens that the splines of the coupler are not aligned with the splines of the power take-off shaft, which happens in a very large percentage of cases, then, in addition to the operation referred to above, a button must be pushed down in the Wilkes, et al, coupler and the guard turned while pushing the button down, until a hole in the coupler housing is engaged. Once this has been done, the entire coupling housing may be rotated at the same time that the guard is being pulled back to keep coupler in an unlocked position; and, at the same time that the entire drive chain is being pulled forward in an opposite direction, whereby the coupler can be aligned with the splines of the shaft to complete the coupler operation as described above.

As can be readily appreciated from the above description of the operation of one of the most commercially successful coupling devices on the market today, there is a need for a coupler with a simplified operation for use.

SUMMARY OF THE INVENTION

The present invention therefore comprises a shaft coupling mechanism which overcomes the cumbersome problems of the prior art by providing a coupler which locks the shaft into the housing upon insertion of the shaft into the housing; permits easy disengagement of the shaft from the housing, automatically holding the locking means in the unlocked position upon withdrawal of the shaft; and permits easy rotational adjustment of the internally splined housing for alignment with the external splines of the shaft; the foregoing being accomplished by a minimum of manual operations and adjustments by the user. According to the present invention, the user need only rotate the guard to align the housing with the shaft splines, and then simply pull the housing over the shaft to achieve the desired coupling automatically. The advantages of the present invention over the prior art concerning simplicity of operation are, thus, truely significant. The device furthermore provides a novel design for a follower which includes: the provision on the follower member of three pairs of external splines circumferentially spaced at 120° intervals, the three-pair spline design being suitable for use with either the six-spline or twenty-one-spline applications which are most commonly employed; the provision of a spring means for retaining the follower within the opening of the housing; and the inclusion in the opening of one or more stop pins for preventing overtravel of the shaft within the housing to protect the internal parts thereof.

It is therefore an object of the present invention to provide an improved coupling device for transmitting torque force from one shaft to another.

Another object of the invention is to provide a coupling device which automatically locks by merely inserting a shaft into the coupling device.

A further object is the provision of a coupling device which provides a novel follower means.

Yet another object is the provision of a novel follower means having a three-pair spline design.

Still another object is the provision of a spring means for retaining the follower within the housing.

Yet another object is the provision of a coupling device which protects the internal parts from overtravel of the PTO.

A still further object is the provision of a coupling device which includes an adjustment mechanism fixed to the housing guard and operable to rotatably adjust the housing whenever the coupler device is in the unlocked position.

A still further object is the provision of an integrally formed guard and adjustment mechanism.

Another object of the invention is to provide an improved coupling device which is economical to manufacture.

A further object of the invention is to provide an improved coupling device which is simple and dependable to use.

Still another object of the invention is to improve and simplify a coupling apparatus which has been proven to be dependable and is commercially successful.

These and other objects, advantages, and novel features of the present invention will become apparent from the following detailed description of the invention when considered in conjunction with the accompanying drawings.

BRIEF DESCRIPTION OF THE DRAWINGS

FIG. 7 is an exploded view of the guard structure of the first three embodiments of the present invention, the three parts to the right of the guard member being alternate embodiments, the centermost of the three rightmost embodiments being the embodiment shown in FIGS. 1-4;

FIG. 8 is a view like FIG. 4, but showing the embodiment like the bottom-most embodiment of FIG. 7;

FIG. 9 is a view taken along line 9—9 of FIG. 8, showing an embodiment wherein the fingers engage the ball elements whereby the guard can be used to rotate and adjust the position of the housing of the coupling in solid lines and, in dashed lines, the position of the adjusting structure of such embodiment with respect to the ball elements when the coupler is in the locked position with the cam holding the locking elements down;

DESCRIPTION OF THE PREFERRED EMBODIMENTS

Figure 1:
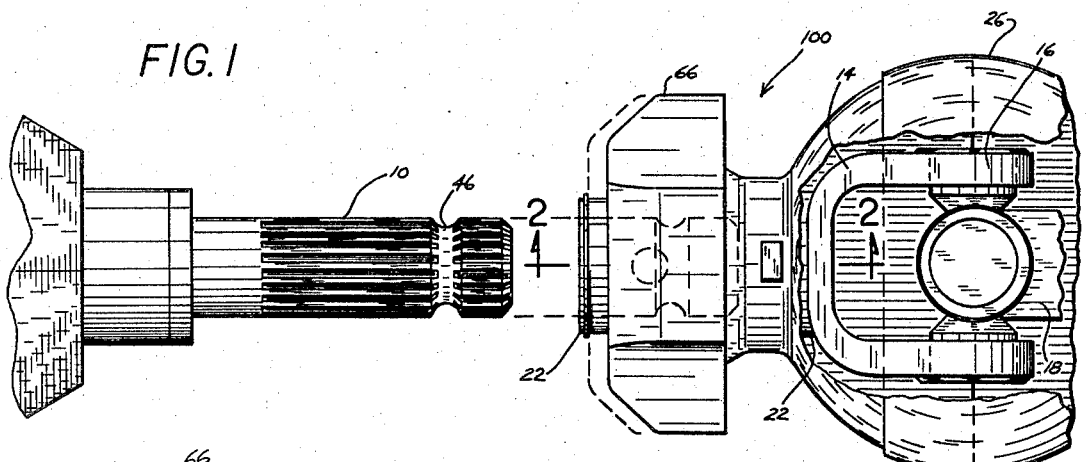
FIG. 1 is a side-elevational view of the power take-off shaft of a tractor and one embodiment of the present invention shown in readiness to be placed onto the power take-off shaft.

Referring now to the drawings wherein like reference numerals designate identical or corresponding parts throughout the several views, FIG. 1 shows a first embodiment 100 shown in readiness to be connected to a power take-off shaft 10 of a tractor. It is noted that to the extent that this disclosure has parts identical to that shown in the Wilkes, et al, U.S. Pat. No. 3,747,966, such patent is hereby incorporated by reference since this invention is an improvement of U.S. Pat. No. 3,747,966.

As shown in FIG. 1 of the drawings, the shaft coupling mechanism of the invention is for use with an externally splined shaft 10 which may, for example, comprise the power take-off shaft of an agricultural tractor, and includes a mating, internally splined coupler 100 employed to drivingly connect the PTO shaft with a trailing or rear mounted implement. To accommodate relative movement between the tractor and the implement, the coupler 100 is provided with a universal joint 14 adjacent to its rearward end, the joint 14 comprising a pair of pivotally interconnected front and rear yoke members 16 and 18, in a manner well known. The front yoke member 16 has a forwardly extending hollow housing 22 integral with its forward end and internally splined to axially receive the shaft 10.

To guard against accidental contact with the rotating yokes 16, 18 and housing 22, a spherical shell 26 of a known type encloses the same.

The mechanism employed to axially lock the power shaft 12 on the PTO shaft 10 includes three locking elements, or balls, 42 received for radial movement in three equally spaced apertures 44 extending through the wall of the housing 22. The balls 42 are movable in the apertures 44 between a radial outward, unlocking position wherein the housing 22 is free to move axially on the shaft 10 (see FIG. 3), and a radial inward, locking position wherein the balls 42 are operative to engage a circumferential recess 46 formed near the terminal end of the shaft 10 and thereby axially lock the housing 22 on the shaft 10 (see FIG. 2). The balls 42 are normally biased to their inward, locking position by means of a camming ring 48 axially slideable on the periphery of the housing 22 between a first position shown in FIG. 2, in which the ring 48 surrounds the balls 42 and prevents their radial outward movement, and a second position in which the ring 48 is spaced rearwardly from the balls 42. A coil spring 50 acts between the rear side of the ring 48 and a flange 52 on the housing 22 to bias the camming ring 48 toward its first position.

Figure 4:
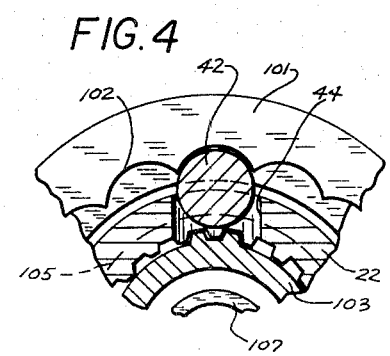
FIG. 4 is an enlarged partial cross-sectional view taken along line 4—4 of FIG. 3.
Figure 6:
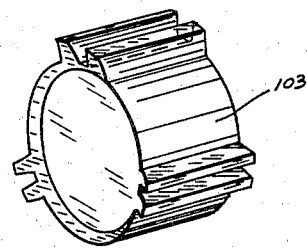
FIG. 6 is a perspective view of the three pair spline follower of the present invention.
Figure 10:
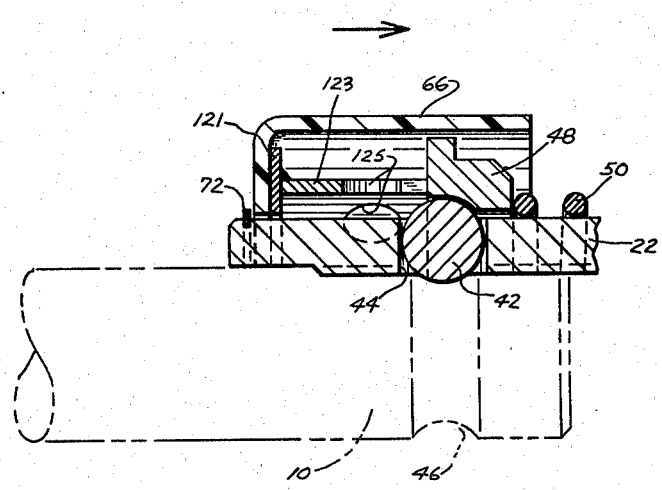
FIG. 10 is a cross-sectional view taken along line 10—10 of FIG. 8 showing the locking elements in a locked relationship with respect to the power take-off shaft.
Figure 11:
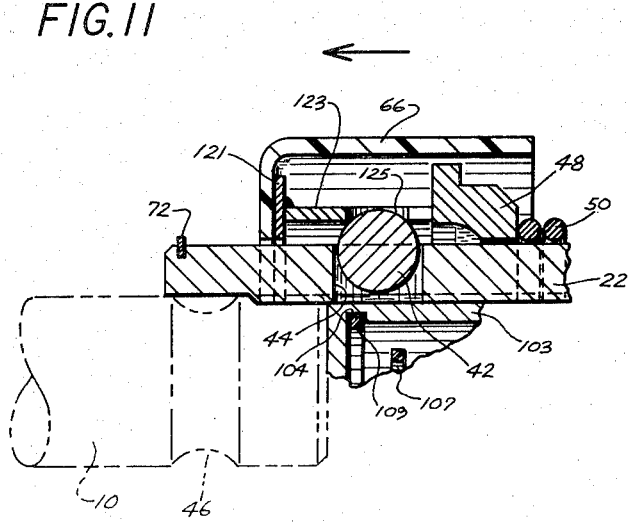
FIG. 11 is a cross-sectional view, like FIG. 10, but showing the coupler in an unlocked position with the coupler in a stage of being removed from the power take-off shaft.

A support ring 54 is slideably mounted on the periphery of housing 22 forwardly of the camming ring 48 and is engageable therewith to move the ring rearwardly against the urging of the spring 50. Support ring 50 has an axially extending portion 56 which is supported by an inwardly extending flange 57 at its forward end which slideably encircles housing 22. Portion 56 has an outwardly extending flange 58 at its rearward end. The flange 58 rigidly supports a washer member 101. Member 101 has a plurality of arcuate shaped cuts 102 taken out of the inner periphery thereof. These arcuate cuts 102 are substantially of the same or slightly larger diameter than the locking ball elements 42 as can be clearly seen in FIG. 4. The member 101 is also shown in FIG. 6 along with alternate embodiments 113 and 120 which will later be described. A post 64 is rigidly secured at its lower end to the upper side of the axially extending portion 56 of the support ring 54.

A collar 66 loosely surrounds the support ring 54, as well as the camming ring 48, and includes a radial portion 68 slideably received by the housing 22, and axial portions 70 extending rearwardly and having an aperture 65 through which the upper end of the post 64 extends. A removable ring 72, engageable with a circumferential groove in the forward end of the housing 22, is normally operable to prevent removal of the collar 66 from the housing 22. The collar 66 and support ring 54 and washer 101 are rotatable as a unit relative to the housing 22. The collar serves as a shield member for the extreme forward end of the coupler 100.

Figure 5:
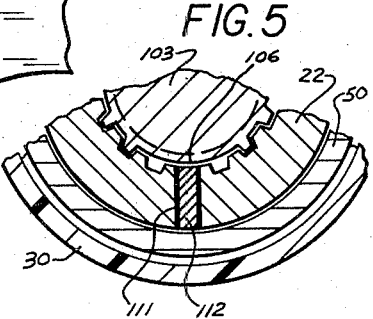
FIG. 5 is an enlarged partial cross-sectional view taken along line 5—5 of FIG. 2, and showing a modified twenty-one spline follower member.

A follower element 103 can be seen in FIGS. 2-6. This follower element 103 has three pairs of external splines which are circumferentially spaced at 120° intervals as shown in FIG. 6. (While the follower 103 is shown with a solid end in FIG. 6, the end could be provided with a suitable opening to permit foreign material to pass through, preventing the buildup of foreign material in the opening of the housing 22). Couplers for use with PTO shafts are generally either six spline or twenty-one spline types. The housing 22 disclosed is a twenty-one spline housing and the three pairs of external splines of the follower 103 mate with corresponding splines and grooves of the opening of the housing 22. (Note that FIG. 5 shows a twenty-one spline follower later described.)

Figure 2:
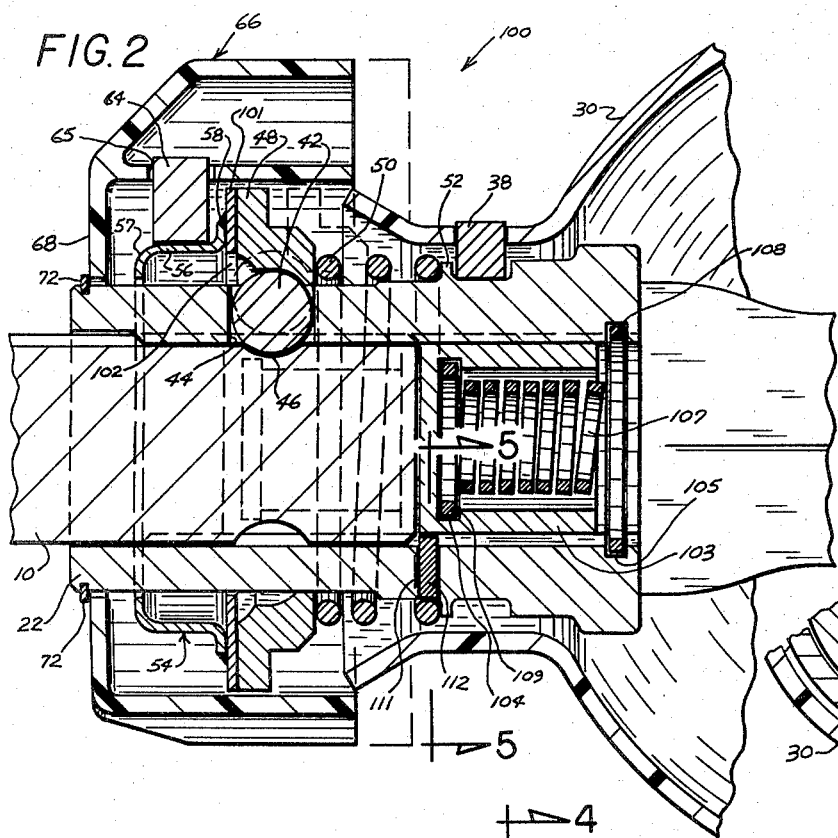
FIG. 2 is a cross-sectional view taken along line 2—2 of FIG. 1.

Follower element 103 has a squared recess 104 formed at the forward end of its hollow cylindrical interior as shown in FIG. 2. Another squared recess 105 is formed internally in the rearward portion of the opening in housing 22 as is also shown in FIG. 2. A spring 107, has a square cross-section and an enlarged rearward coil 108 and an enlarged forward coil 109. Spring 107 is compressed substantially entirely within the follower 103 as shown in FIG. 2 and is secured at its forward end to the follower 103 by means of the securement of the enlarged forward coil 109 within the recess 104. The rearward end of the spring 107 is secured to the housing 22 by means of the enlarged rearward coil 108 which is received within the recess 105. In the position shown in FIG. 2, the PTO shaft 10 has pushed the follower element 103 to the right, or rearwardly, (as will later be described more fully), causing the compression of the spring 107 within the element 103. The spring 107, thus, is biasing the follower element 103 to the left, or forwardly, in FIG. 2 which serves a purpose later described more fully. The squared edges of the spring 107 provide for optimal frictional securement between the end coils 108, 109 and recesses 105, 104. A spring of circular cross-section could alternatively be employed, however, together with suitable curved recesses in the element 103 and housing 22. The invention is not intended to be limited to a spring having a square cross-section.

Figure 3:
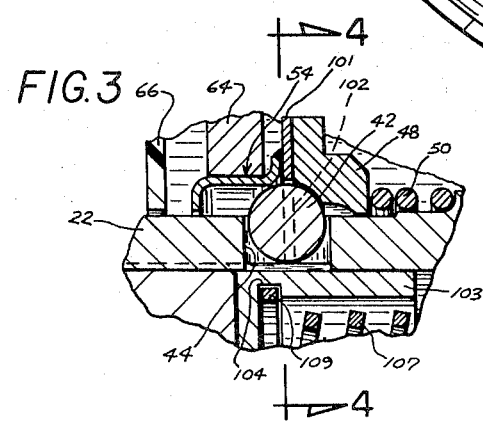
FIG. 3 is an enlarged cross-sectional view of a portion of what is shown in FIG. 2, but showing the apparatus in a locked open position and in a position whereby rotation of the guard means will cause rotation of the housing of the coupler.

A PTO overtravel stop means is optionally provided and comprises one or more pins 112 which are frictionally received within suitable apertures 111 which extends from the opening into the housing 22. Only one pin 112 is shown in FIGS. 3 and 5 for illustration but two or more disposed in a symetrical pattern to prevent binding would be optional. The pin 112 extends upwardly into the opening of housing 22 as shown. With the three pair spline arrangement of FIGS. 2-4 and 6, there are no splines along the bottom portion of the follower 103 and consequently the follower 103 can pass over the pin 111 without obstruction. With reference to FIG. 5 which shows a modified twenty-one spline follower 103, where the pin 112 is utilized, the external spline arrangement of the follower 103 would be modified to remove the necessary number of splines (probably two) to permit the follower 103 to pass over the pin 112 as the follower 103 moves to the left, or forwardly, upon withdrawal of the shaft 10. The removal of the splines, thus, produce a clearance in element 103 in which the pin 112 is slideably received. This pin 112 provides a means for preventing overtravel of the shaft 10 within the housing opening to protect spring 107 as will later be discussed more fully. Of course, if more than one pin 112 is used, splines would be removed on the follower 103 to accomodate each pin 112.

Having disclosed the structure of the first embodiment of the present invention, its operation will now be described.

FIG. 2 shows the shaft 10 coupled to the device 100 by means of the securement of the locking elements, or balls, 42 within the recess 46 of the shaft 10. The balls 42 are held within the recess 46 by the camming ring 48 which is biased to the left, or forwardly, in FIG. 2 by the spring 50. This manner of securing a PTO shaft 10 within a coupler is well known.

To remove the shaft 10 from the coupler 100, the power to the shaft 10 is first disengaged as a safety measure, and guard 66 is then moved manually to the right, or rearwardly, in FIG. 2 against the force of spring 50. This movement of guard 66 is transmitted to support ring 54 via post 64, and to camming ring 48 via its abutment with washer 101 which is rigidly secured to the support ring 56. As the curved inner surface of the camming ring 48 moves to the right in FIG. 2, the balls 42 are free to move upwardly to the unlocked position shown in FIGS. 3 and 4 which frees the shaft 10 for withdrawal. As the shaft 10 is withdrawn, the balls 42 are moved to the position shown in FIG. 3, and the follower member 103 follows the shaft 10 due to the biasing force of spring 107. As the shaft 10 passes the balls 42, the splines of the follower element 103 contact the balls 42 to retain them within the apertures 44 of the housing 22. With the three pair spline follower, each pair of splines contacts one of the balls 42. The spring 107 is of a sufficient length when uncompressed to position follower 103 sufficiently to the left, or forwardly, in FIG. 3 to "seal" the apertures 44 and prevent the balls 42 from following therethrough. When the follower element 103 is in this forward position it is in what is denoted as a first position. The spring 107 also serves to retain the follower 103 within the splined interior of housing 22 at all times due to its securement to the housing 22 at its rearward end and to the follower 103 at its forward end as before described. Note also, that, as before mentioned, the pin 112 does not obstruct the movement of the follower 103 due to the absence or removal of one or more of the splines of follower 103 as discussed above.

With the shaft 10 withdrawn, the balls 42, are thus, held in the unlocked position by the follower 103 in this first, or forward position. Note that guard 66 is moveable between the solid and dotted lines in FIG. 1 while the coupler 100 is in this position. To reengage the shaft 10 (and again with the power to the shaft 10 being disengaged for safety) the coupler 100 is moved proximate to the end of shaft 10. If the splines of shaft 10 are not in alignment with the internal splines of the housing 22, the guard 66 is pulled back to the solid line position of FIG. 1 which places the washer member 101 in the position shown in FIGS. 3 and 4. In this position, the rotation of the guard 66 will transmit rotation through post 64 to support ring 54 and washer 101 and the rotation of washer 101 will move the balls 42 in the arc of rotation causing rotation of the housing 22 due to the contact between the balls 42 and apertures 44. (See FIG. 4) Hence, with the guard 66 pulled back and the balls 42 held in the unlocked position by the follower 103 guard 66, support ring 54, washer 101, balls 42 and housing 22 rotate as a unit, and comprise an adjustment mechanism which permits the internal splines of the housing 22 to be easily rotatable for alignment with the splines and grooves of the shaft 10. Once the shaft 10 and housing 22 are aligned, the shaft 10 is inserted into the housing 22, the external splines of shaft 10 mating with the internal splines of housing 22. As the shaft 10 travels to the right, or rearwardly, in FIG. 2, it will contact follower 103 and push it rearwardly compressing the spring 107. Eventually, the rearward movement of the shaft 10 in FIG. 2 will cause the recess 46 to register with the holes 44 which will allow the balls 42 to move into recess 46 due to the action of camming ring 48 and spring 50. The locking elements, or balls, 42 are then held in the recess 46 by the cam ring 48 and compression spring 50 to axially lock the shaft 10 within the coupler 100. Of course, the mating splines of the shaft 10 and housing 22 lock the same for rotation. With the shaft 10 thusly locked onto the coupler 100, the follower 103 is moved back to its rearward, or second, position while the balls 42 assume their locking position. Hence, whenever the follower 103 is in its forward position, the balls 42 are in their unlocked position, and whenever the follower 103 is in its rearward position, the balls 42 are in their locked position.

Note that the pin, or pins, 112 stop further movement of the shaft 10 within the housing 22 by contacting one or more of the shaft splines should the balls 42 fail to drop into the recess 46. This stop mechanism 112 protects the spring 107 and other internal parts from damage due to over travel of the shaft 10 within the housing 22.

To unlock the shaft 10, as mentioned above, the guard 66 is simply pulled rearwardly against the force of spring 50 to allow the balls 42 to move to their unlocked position shown in FIG. 3 as the shaft 10 is withdrawn and the follower 103 moves to seal the apertures 44 and assume its forward position as aforedescribed. Note that while the follower element 103 has been thus far disclosed as being biased only by spring 107, the element 103 could additionally be provided with a magnetic portion at its forward end by which it could become magnetically attached to the shaft 10 and follow it in the same manner as hereinabove described. Of course, some means for retaining the element 103 within the housing 22 such as the spring 107 would be provided in this embodiment.

Referring now to the second embodiment which is shown at the top right corner of FIG. 7, it is noted that the element 113 has a front face 114 which is substantially identical in shape to the washer 101 of the first embodiment except for the presence of openings 115 therein. This member 113 is received in the opening 116 in the guard 66 and bolts 117 are utilized to connect member 113 to guard 66 by passing through openings 118 in such guard 66 and being threaded into the openings 115 of second embodiment 113. In this embodiment, the post 64 and support ring 54 are eliminated and the embodiment 113 is so designed that after securement to the guard 66 by means of bolts 117, the front face 114 occupies the same position in guard 66 as the washer 101 of the first embodiment.

The operation of the second embodiment 113 is identical to the above described operation of the first embodiment 101 as should be readily appreciated by those skilled in the art.

Referring now to the third embodiment shown in FIGS. 8–11 and in the lower right-hand corner of FIG. 7, it is noted that this third embodiment utilizes a member 120, including a washer 121 having openings 122 on each side thereof so that the washer 121 can be affixed to the guard 66 by utilization of bolts 117 and openings 118 in the guard 66. A sleeve member 123, including longitudinally extending finger members 124, is rigidly attached to the washer 121, such as by welding. These finger members 124, which are formed by means of a bore 125 and a cut out section 126, can be formed in other ways and can be of other configurations and still be quite operative.

This third embodiment 120 (and the fourth embodiment later described) has an advantage over the first two embodiments described above: Namely, it is not necessary to move the guard 66 to the position shown in solid lines in FIG. 1 to lock the housing 22 into rotation with the guard 66 for adjustment and alignment of the splines. As long as the coupler of the third embodiment is in an unlocked position, such as that shown in FIG. 11, the balls 42 will be locked between adjacent fingers 124 thereby allowing the housing 22 opening to be readily aligned with the power take-off shaft 10 by merely turning the guard 66. Thus, the adjusting mechanism provided here yields an additional advantage by requiring one less step in the operation of coupling the shaft 10 to the coupler 100. Aside from this advantageous feature, this third embodiment 120 operates identically for engagement and disengagement with the shaft 10 as the first and second embodiments described above. It is, of course, understood that, as with the first and second embodiments, the guard 66 is free spinning whenever the balls 42 are locked into the recess 46 of the shaft 10.

Figure 12:
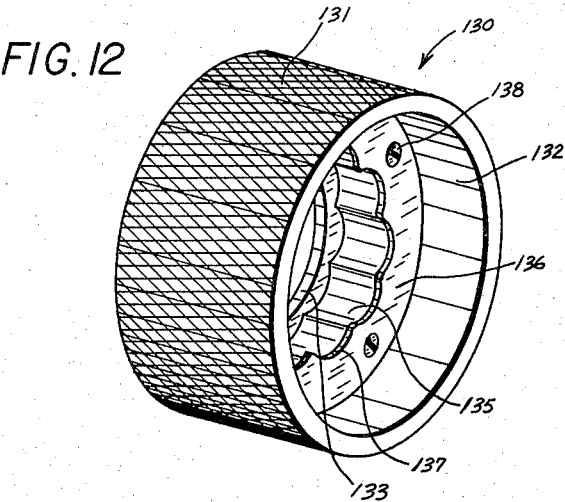
FIG. 12 is a fourth embodiment of the present invention showing a perspective view of an integrally formed guard structure and adjusting structure.
Figure 13:
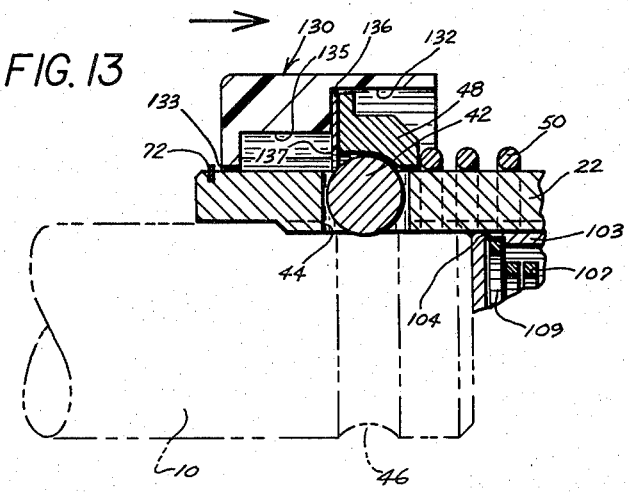
FIG. 13 is a cross-sectional view of such fourth embodiment, similar to the embodiment and view of FIG. 9, showing the coupler locked onto a power take-off shaft.
Figure 14:
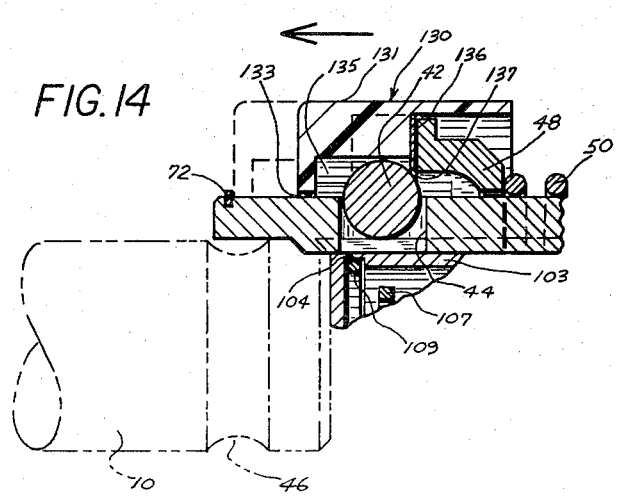
FIG. 14 is an enlarged partial cross-sectional view like FIG. 12, but showing the fourth embodiment in an unlocked position wherein the guard and adjusting mechanism are in engagement with the locking ball elements whereby the housing of the coupler can be readily rotated to align the opening of the coupler with the splines of the power take-off shaft.

Referring now to the fourth embodiment 130 of FIGS. 12–14, it is noted that the guard and adjusting mechanism have been combined into an integral unit. A knurled surface 131 is shown, although the particular type of surface is not critical. This member 130 has a first inner periphery 132 which is large enough to receive the cam ring 48 and an innermost radius 133 which is just large enough to be slideably received over the housing 22. Between the large and small inner peripheries 132 and 133, respectively, is a structure having a plurality of longitudinally disposed arcuate depressions or grooves 135 therein. A stop ring 136, having an inner edge comprised of adjoining arcuate portions 137, corresponding to the grooves 135, is secured at the rearward end to the grooved structure by means of fasteners 138 as shown in FIGS. 12–14.

The operation of the device 130 shown in FIGS. 12–14 is substantially identical to the operation of the third embodiment described above with respect to FIGS. 8–11. Whenever the locking ball elements 42 are in the unlocked position as shown in FIG. 14, the stop ring 136 contacts the balls 42 and axially secures the member 130 against forward movement, while retaining each of the balls 42 within one of the grooves 135. Hence, whenever the balls 42 are in the unlocked position, the housing 22 rotates with the member 130 to permit alignment of the splines. This feature eliminates the need to have to pull back on member 130 to permit operation of the adjusting mechanism of this embodiment. The stop ring 136 also serves to reduce wear.

Of course, as with the other embodiments, whenever the locking ball elements 42 are in the position shown in FIG. 13 whereby they are locked radially inwardly by the cam 48 into the depression 46 in power take-off shaft 10, then the guard 130 is free spinning to afford the safety feature needed to prevent the operator thereof from getting his body or clothing "wrapped-up" in the rotating structure.

The operation of this fourth embodiment 130 for engaging or disengaging the shaft 10 is otherwise the same as described above with regard to the other embodiments.

Figure 15:
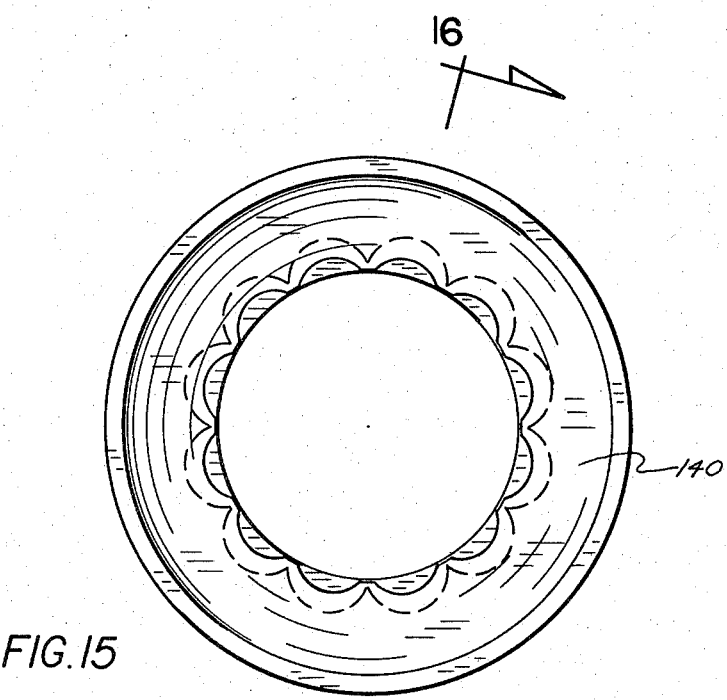
FIG. 15 shows a plan view of an integrally formed guard and adjusting structure.
Figure 16:
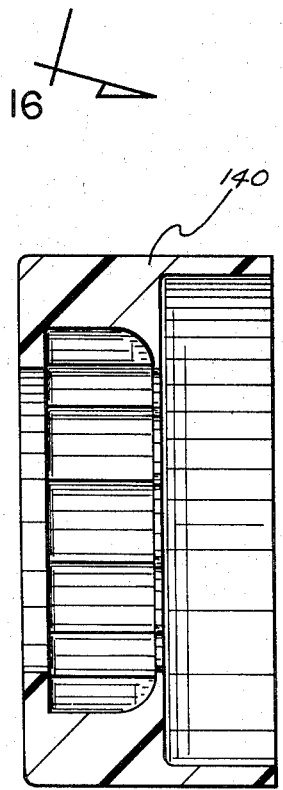
FIG. 16 is a cross-sectional view taken along line 16—16 of FIG. 15.

Member 130 can be made as a single piece casting 140 as disclosed in FIGS. 15, 16.

Accordingly, it is believed to be clear that the above described embodiments do indeed accomplish all of the objects referred to above. Obviously many modifications and variations of the present invention are possible in light of the above teachings. For example, the elements 101, 113, 120 and 130 can be constructed in many different ways and of many different materials. They can, for example, be molded in one piece with the guard, such as in element 130, or made as separate elements to be connected together. It is therefore to be understood that, within the scope of the appended claims, the invention may be practiced otherwise than as specifically described.

I claim:

1. A torque transmitting coupling comprising:
a housing;
an opening in said housing, a portion of said opening being non-circular, said opening being adapted to receive a non-circular portion of a shaft;
means for selectively locking the non-circular portion of said shaft into the opening in said housing, said locking means being biased to a locked position and selectively movable to an unlocked position;
means operable in response to the removal of said shaft from said opening for holding said locking means in the unlocked position whereby said shaft can be re-inserted into said opening, said holding means comprising a member disposed within said opening and movable within said opening from a first position holding said locking means in said unlocked position to a second position allowing said locking means to move to a locking position; said holding means further comprising a spring for biasing said member to said first position, said member being pushed to said second position by said shaft when said shaft is inserted into said opening and following said shaft to move from the second to the first position thereof when said shaft is removed from the opening whereby said holding means holds said locking means in the unlocked position when the shaft is removed from the opening and allows said locking means to move to the locked position when said shaft is disposed within said opening; said holding means further including a means for retaining said member in said opening, said retaining means comprising said spring means, said spring means having a first coil securely received within a first recess internally formed in said member and a second coil securely received within a second recess internally formed in said housing.

2. The coupling of claim 1 wherein said first and said second recesses are squared recesses and wherein said spring has squared edges.

3. A torque transmitting coupling comprising:
a housing;
an opening in said housing, a portion of said opening being non-circular, said opening being adapted to receive a non-circular portion of a shaft;
means for selectively locking the non-circular portion of said shaft into the opening in said housing, said locking means being biased to a locked position and selectively movable to an unlocked position;
means operable in response to the removal of said shaft from said opening for holding said locking means in the unlocked position whereby said shaft can be re-inserted into said opening, said holding means comprising a member disposed within said opening and movable within said opening from a first position holding said locking means in said unlocked position to a second position allowing said locking means to move to a locking position, said holding means further comprising a means for biasing said member to said first position, said member being pushed to said second position by said shaft when said shaft is inserted into said opening and following said shaft to move from the second to the first position thereof when said shaft is removed from the opening whereby said holding means holds said locking means in the unlocked position when the shaft is removed from the opening and allows said locking means to move to the locked position when said shaft is disposed within said opening; and
means for stopping said shaft once said member has been pushed to said second position.

4. The coupler of claim 3 wherein said stop means comprises a stop secured to said housing and extending into said opening to obstruct the movement of said shaft once said member has been pushed to the second position.

5. The coupler of claim 4 wherein said stop comprises a first stop, and wherein said stop means further comprises second and third stops secured to said housing and extending into said opening.

6. The coupler of claim 4 wherein said member accommodates said stop so that said stop does not obstruct the movement of said member.

7. A torque transmitting coupling comprising:
a housing;
an opening in said housing, a portion of said opening including a plurality of parallel internal splines and grooves aligned with the longitudinal axis of said opening and disposed around the periphery thereof, said opening being adapted to receive a shaft having a plurality of external splines and grooves;
means for selectively locking the splined portion of said shaft into the opening in said housing, said locking means being biased to a locked position and selectively movable to an unlocked position; and
means operable in response to the removal of said shaft from said opening for holding said locking means in the unlocked position whereby said shaft can be re-inserted into said opening, said holding means comprising a member disposed within said opening and movable within said opening from a first position holding said locking means in said unlocked position to a second position allowing said locking means to move to a locking position, said member including three pairs of external splines, each of said pairs of splines being slideably received within corresponding grooves in said opening, said holding means further comprising a means for biasing said member to said first position, said member being pushed to said second position by said shaft when said shaft is inserted into said opening and following said shaft to move from the second to the first position thereof when said shaft is removed from the opening whereby said holding means holds said locking means in the unlocked position when the shaft is removed from the opening and allows said locking means to move to the locked position when said shaft is disposed within said opening.

8. A coupling comprising:

a housing;

an opening in said housing, a portion of said opening being non-circular, said opening being adapted to receive a non-circular portion of a shaft;

means for selectively locking the non-circular portion of said shaft into the opening in said housing, said locking means being biased to a locked position and selectively movable to an unlocked position;

said locking means comprising a plurality of bores radially disposed in said housing, a locking element slideably disposed in each of said bores and radially movable from an inner, locking position, wherein said elements are engageable within a recess of said shaft to thereby prevent relative axial movement of said housing with respect to said shaft, and an outer, unlocked position whereby said elements permit relative axial movement of said housing and said shaft;

an annular cam means slideably disposed around said housing and being axially movable between a first position holding said locking elements in their locking position and a second position allowing said locking elements to move to their unlocked position and means for biasing said cam means to said first position;

guard means rotatably disposed around said housing for preventing human contact with said housing when said housing is locked onto said shaft;

adjusting means attached to said guard means and around said housing and disposed between said housing and said guard means, said adjusting means being operable to move said cam means from the first to the second position thereof, said adjusting means having a plurality of depressions around the periphery thereof for contacting said locking elements when said locking elements are in the unlocked position thereof, whereby rotation of said guard means causes rotation of said adjusting means which causes rotation of said housing and whereby said opening in said housing can be aligned with said shaft for placing said housing over said shaft; and means operable in response to the removal of said shaft from said opening for holding said locking means in the unlocked position thereof whereby said shaft can be re-inserted into the opening and automatically locked into said opening upon insertion, said holding means comprises a member disposed within said opening and movable within said opening from a first position holding said locking means in said unlocked position to a second position allowing said locking means to move to a locking position, said member being biased to said first position by a spring, said spring comprising a means for retaining said member in said opening, said spring having a first coil securely recieved within a first recess formed in said member and a second coil securely received within a second recess formed in said housing.

9. The coupling of claim 8 wherein said first and second coils have squared edges, and wherein said first and second recesses are squared recesses.

10. A torque transmitting coupling comprising:

a housing;

an opening in said housing, a portion of said housing being non-circular, said opening being adapted to receive a non-circular portion of a shaft;

means for selectively locking the non-circular portion of said shaft into the opening in said housing, said locking means being biased to a locked position and selectively movable to an unlocked position;

said locking means comprising a plurality of bores radially disposed in said housing, a locking element slideably disposed in each of said bores and radially movable from an inner, locking position, wherein said elements are engageable within a recess of said shaft to thereby prevent relative axial movement of said housing and said shaft;

an annular cam means slideably disposed around said housing and being axially movable between a first position holding said locking element in their locking position and a second position allowing said locking elements to move to their unlocked position and means for biasing said cam means to said first position;

guard means rotatably disposed around said housing for preventing human contact with said housing when said housing is locked onto said shaft;

adjusting means attached to said guard means and around said housing and disposed between said housing and said guard means, said adjusting means being operable to move said cam means from the first to the second position thereof, said adjusting means having a plurality of depressions around the periphery thereof for contacting said locking elements when said locking elements are in the unlocked position thereof, whereby rotation of said guard means causes rotation of said adjusting means which causes rotation of said housing and whereby said opening in said housing can be aligned with said shaft for placing said housing over said shaft;

means operable in response to the removal of said shaft from said opening for holding said locking means in the unlocked position thereof whereby said shaft can be re-inserted into the opening and automatically locked into said opening upon insertion, said holding means comprising a member disposed within said opening and movable within said opening from a first position holding said locking means in said unlocked position to a second position allowing said locking means to move to a locking position, said holding means further comprising a means for biasing said member to said first position, said member being pushed to said second position by said shaft when said shaft is inserted into said opening and following said shaft to move from the second to the first position thereof when said shaft is removed from the opening whereby said holding means holds said locking means in the unlocked position when the shaft is removed from the opening and allows said locking means to move to the locked position when said shaft is disposed within said opening; and means for stopping said shaft once said member has been pushed to said second position.

11. The coupler of claim 10 wherein said stop means comprises a stop secured to said housing and extending into said opening to obstruct the movement of said shaft once said member has been pushed to the second position.

12. The coupler of claim 11 wherein said stop means comprises a first stop, and wherein said stop means further comprises second and third stops secured to said housing and extending into said opening.

13. The coupler of claim 12 wherein said member accommodates said stop so that said stop does not obstruct the movement of said member.

14. A torque transmitting coupling comprising:
a housing;
an opening in said housing, a portion of said opening having internal splines on grooves parallel with the longitudinal axis of said opening, said opening being adapted to receive an externally splined shaft;
means for selectively locking the shaft into the opening in said housing, said locking means being biased to a locked position and selectively movable to an unlocked position;
said locking means comprising a plurality of bores radially disposed in said housing, a locking element slideably disposed in each of said bores and radially movable from an inner, locking position, wherein said elements are engageable within a recess of said shaft to thereby prevent relative axial movement of said housing with respect to said shaft, and an outer, unlocked position whereby said elements permit relative axial movement of said housing and said shaft;
an annular cam means slideably disposed around said housing and being axially movable between a first position holding said locking elements in their locking position and a second position allowing said locking elements to move to their unlocked position and means for biasing said cam means to said first position;
guard means rotatably disposed around said housing for preventing human contact with said housing when said housing is locked onto said shaft;
adjusting means attached to said guard means and around said housing and disposed between said housing and said guard means, said adjusting means being operable to move said cam means from the first to the second position thereof, said adjusting means having a plurality of depressions around the periphery thereof for contacting said locking elements when said locking elements are in the unlocked position thereof, whereby rotation of said guard means causes rotation of said adjusting means which causes rotation of said housing and whereby said opening in said housing can be aligned with said shaft for placing said housing over said shaft; and
means operable in response to the removal of said shaft from said opening for holding said locking means in the unlocked position thereof whereby said shaft can be re-inserted into the opening and automatically locked into said opening upon insertion, said holding means comprises a member disposed within said opening and movable within said opening from a first position holding said locking means in said unlocked position to a second position allowing said locking means to move to a locking position, said member having three pairs of external splines, said pairs of external splines being slideably received in corresponding grooves in said housing.

15. The coupling of claim 14 wherein said three pairs of splines engage said locking means in said first position.

16. A torque transmitting coupling comprising:
a housing;
an opening in said housing, a portion of said opening having internal splines on grooves parallel with the longitudinal axis of said opening, said opening being adapted to receive an externally splined shaft;
means for selectively locking the shaft into the opening in said housing, said locking means being biased to a locked position and selectively movable to an unlocked position;
said locking means comprising a plurality of bores radially disposed in said housing, a locking element slideably disposed in each of said bores and radially movable from an inner, locking position, wherein said elements are engageable within a recess of said shaft to thereby prevent relative axial movement of said housing with respect to said shaft, and an outer, unlocked position whereby said elements permit relative axial movement of said housing and said shaft;
an annular cam means slideably disposed around said housing and being axially movable between a first position holding said locking elements in their locking position and a second position allowing said locking elements to move to their unlocked position and means for biasing said cam means to said first position;
guard means rotatably disposed around said housing for preventing human contact with said housing when said housing is locked onto said shaft;
adjusting means attached to said guard means and around said housing and disposed between said housing and said guard means, said adjusting means being operable to move said cam means from the first to the second position thereof, said adjusting means having a plurality of depressions around the periphery thereof for contacting said locking elements when said locking elements are in the unlocked position thereof, whereby rotation of said guard means causes rotation of said adjusting means which causes rotation of said housing and whereby said opening in said housing can be aligned with said shaft for placing said housing over said shaft; and
means operable in response to the removal of said shaft from said opening for holding said locking means in the unlocked position thereof whereby said shaft can be re-inserted into the opening and automatically locked into said opening upon insertion, said holding means comprises a member disposed within said opening and movable within said opening from a first position holding said locking means in said unlocked position to a second position allowing said locking means to move to a locking position, said holding means holds at least one of said elements into at least one of said depressions in said adjusting means when said shaft is not in said opening in said housing, whereby said guard means is prevented from rotating with respect to said adjusting means, whereby rotation of said guard means causes rotation of said adjusting means, which causes like rotation of said housing because of the force of said adjusting means pushing on at least one of said locking elements; said adjusting means depressions comprising longitudinal grooves formed about an inner periphery of said adjusting means, each of said longitudinal grooves has a rearward end, and a stop member disposed at said rearward end to contact said locking elements when said locking elements are in said grooves, said stop member preventing forward movement of said adjusting means when said locking elements are in said grooves.

* * * * *